No. 761,516. PATENTED MAY 31, 1904.
W. C. LLOYD & C. R. TOWNSEND.
SELF CONTAINED STAND FOR CYCLES OR MOTOR CYCLES.
APPLICATION FILED DEC. 30, 1903.
NO MODEL. 3 SHEETS—SHEET 1.

Witnesses
George G. Schoenlank
John C. Brems

Inventors
William Clayton Lloyd
Charles Ralph Townsend
by H. van Desennek
Attorney

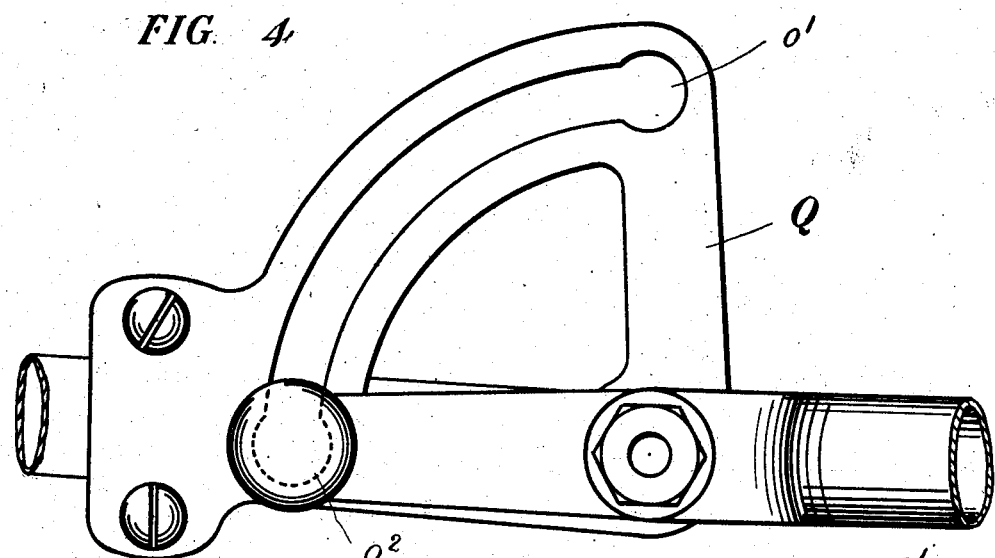
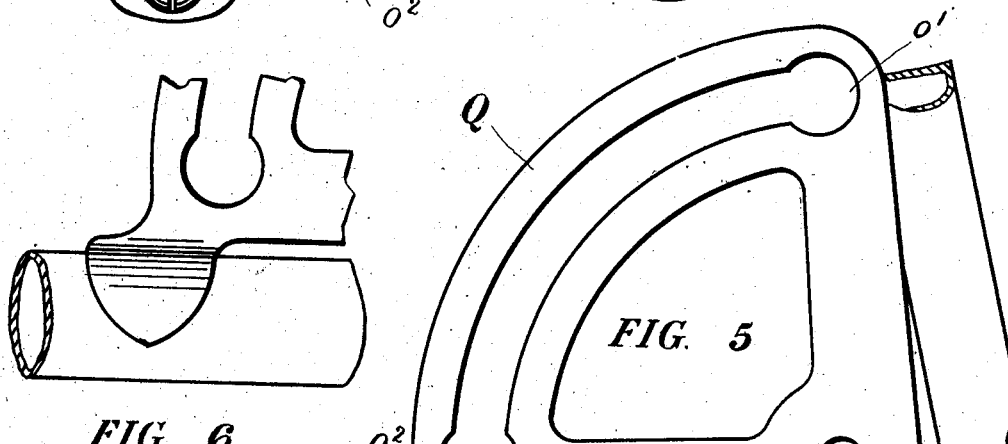
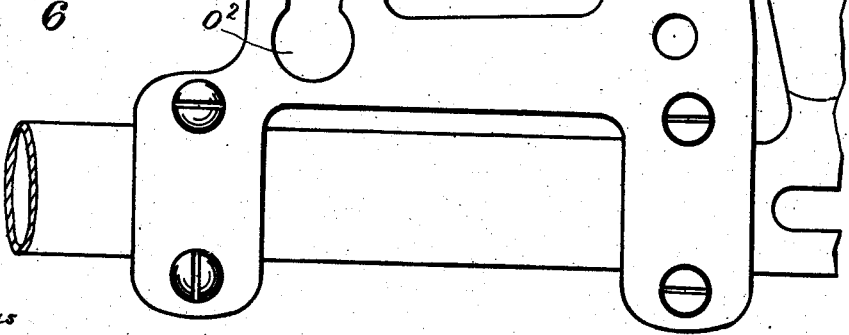

No. 761,516. PATENTED MAY 31, 1904.
W. C. LLOYD & C. R. TOWNSEND.
SELF CONTAINED STAND FOR CYCLES OR MOTOR CYCLES.
APPLICATION FILED DEC. 30, 1903.
NO MODEL. 3 SHEETS—SHEET 3.
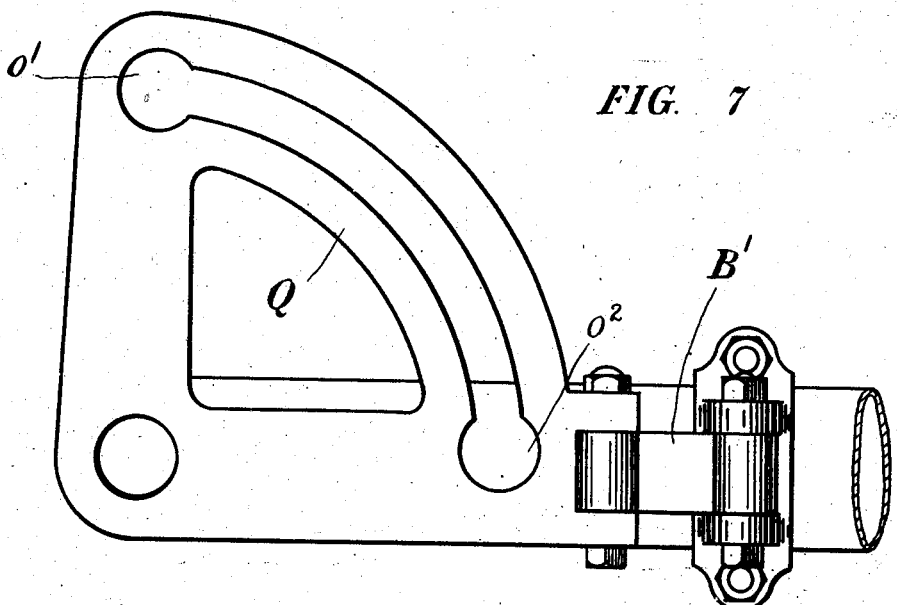
FIG. 7
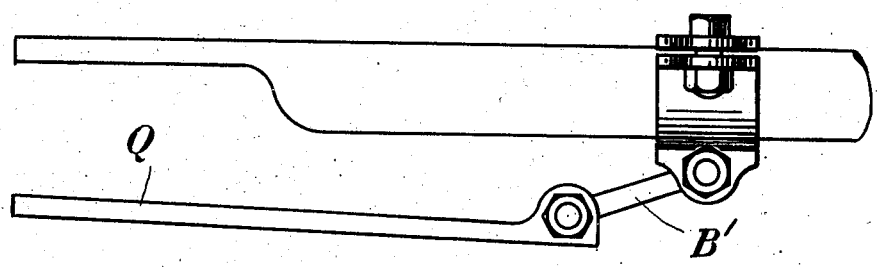
FIG. 7ª
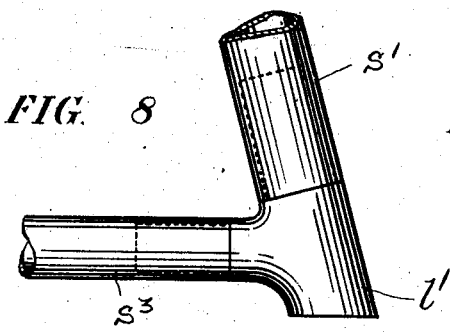
FIG. 8
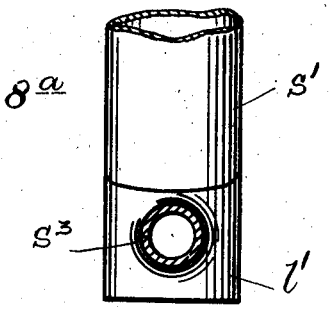
FIG. 8ª
Witnesses
George G. Schoenlank
John C. Brens
Inventors
William Clayton Lloyd
Charles Ralph Townsend
by Frank Oldenmeets,
Attorney No. 761,516. Patented May 31, 1904.

UNITED STATES PATENT OFFICE.

WILLIAM CLAYTON LLOYD AND CHARLES RALPH TOWNSEND, OF BIRMINGHAM, ENGLAND.

SELF-CONTAINED STAND FOR CYCLES OR MOTOR-CYCLES.

SPECIFICATION forming part of Letters Patent No. 761,516, dated May 31, 1904.

Application filed December 30, 1903. Serial No. 187,220. (No model.)

*To all whom it may concern:*

Be it known that we, WILLIAM CLAYTON LLOYD, managing director, and CHARLES RALPH TOWNSEND, manager, subjects of the King of Great Britain, residing at Old Cross street, Birmingham, in the county of Warwick, England, have invented a certain new and useful Self-Contained Stand for Cycles or Motor-Cycles, of which the following is a specification.

Our invention consists in a self-contained support which is attached to the cycle, whether motor or velocipede, and is capable of being instantaneously put into or out of action as a support. Normally it forms an extension to the cycle-framing and forms a guard to the rear wheel. The support possesses not only the functions of an ordinary support for keeping the cycle vertical during a temporary stop or for exhibition purposes, but by being made to lift the rear or driving wheel off the floor when used as a support facilitates inspection and repairs, since the rear wheel is capable of free revolution.

In order to facilitate the conception of our invention and enable the same to be carried more easily into practice, we have appended hereunto three sheets of drawings.

Figure 1:
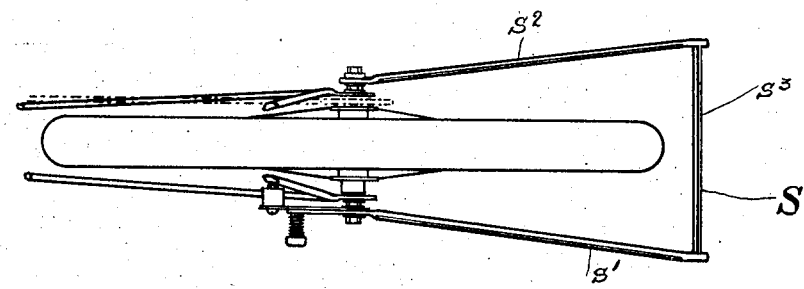
Figure 2:
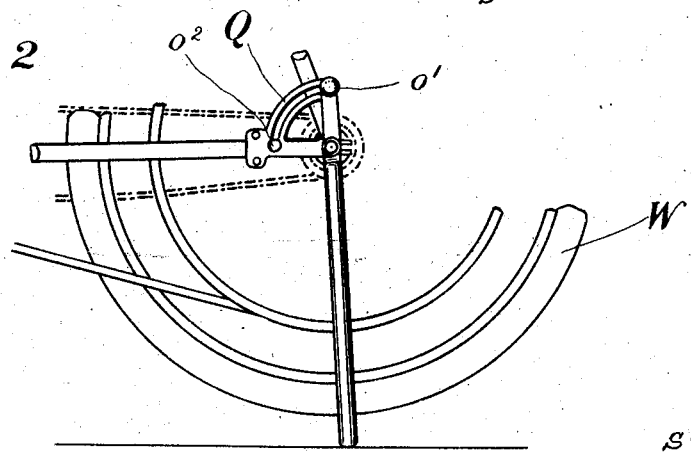
Figure 3:
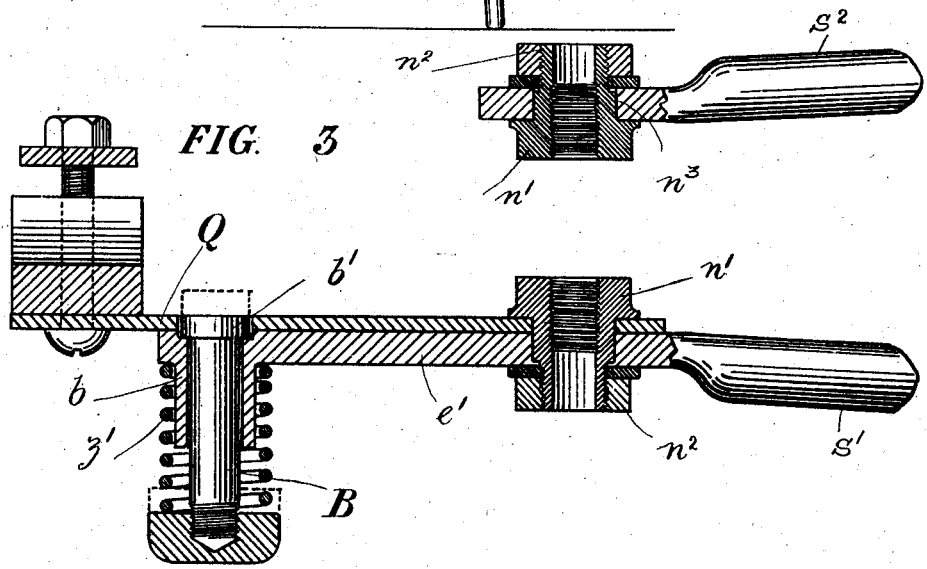

Figure 1 is a plan of the rear wheel of a cycle with our support S attached, but not in use as such. Fig. 2 is a side elevation of the same, showing the support in use and the rear wheel raised off the ground. Fig. 3 is a horizontal section through the pivots and sector of our support. Fig. 4 shows one method of attaching the sector and support to a bicycle, the pivot being on the rear-wheel axle. Fig. 5 illustrates another method of attaching the sector in front of the rear-wheel axle, so as to be clear thereof. Fig. 6 illustrates a method of attaching the sector to the cycle-frame stay by brazing instead of by a clamp. Fig. 7 is a side elevation of the sector with a form of joint which makes the rest capable of adjustment in width to suit various cycle-frames. Fig. 7ª is a plan of Fig. 7. Figs. 8 and 8ª illustrate how the junction of the members of the support is effected when of tubular section.

In making our support S and means for attaching it to a cycle or motor-cycle we employ three members $s'$, $s^2$, and $s^3$ of tubular or other cross-section and connect them at their outer ends by lugs $l'$, Figs. 8 and 8ª, which also form the feet of the support. The other ends of the side members $s'$ and $s^2$ are flattened to form bearings, and one member has a cast or welded extension $e'$ with a wide bearing-boss $b$, which carries the bolt B, held normally outward by the springs $z'$. The bearings, which fit into holes in the side members $s'$ and $s^2$, are formed by a pair of special nuts $n'$ and $n^2$ in each case, the inner nuts $n'$ being tapped internally to receive the ends of the bicycle rear-wheel spindle and having a middle exterior reduced portion $n^3$ for a pivot upon which the support S pivots. The nuts are then further reduced and screwed to take the external washers and nuts $n^2$. (*Vide* Figs. 1, 2, and 3.)

The quadrant or sector Q is a flat piece of metal having a circular slot extending through about ninety degrees and may be held at its center on the nut $n'$ and to the stay of the cycle-frame at one angle. By any of the methods illustrated, for example, in Figs. 3 and 4 a block-clamp is employed. In Fig. 6 a union has been effected by brazing, and in Figs. 7 and 7ª a double knuckle-joint B' is employed to allow for adaptation to varying widths of cycle-frames.

It will be seen that normally the spring $z'$ holds the bolt B, with its enlarged end $b'$, Fig. 3, in contact with the enlargement $o'$ or $o^2$ at either end of the circular slot in the sector, according to whether the support is in use as such or extended behind, as in Fig. 1. Suppose the support S to be extended behind as a protector to the wheel W. If the bolt B is pushed in, so that its reduced portion enters the slot and its enlargement $b'$ clears it, Fig. 3, the support may be pivoted downward, assisted by gravity, the bolt being reshot automatically as the bolt covers enlargement $o'$. At the same time by reason of the length of the members $s'$ and $s^2$ the rear wheel is lifted clear of the ground, as seen in Fig. 2. This lifting movement is accelerated by giving the machine a slight backward movement at the same instant.

What we claim, then, is—

1. In a portable support for cycles and motor-cycles, a three-membered frame inclosing the rear portion of the rear wheel and pivoted to the hub thereof, an extension on one of the members above the pivot, a bolt in said extension, a spring on said bolt for pressing the same outwardly, and a segment-piece secured to the hub and the frame of the cycle having a segmental slot therein, having enlarged ends, said bolt sliding in said slot and having its head adapted to fit in the enlarged ends whereby it will lock the support in either vertical or horizontal position.

2. In a portable support for cycles and motor-cycles, a three-membered frame inclosing the rear portion of the rear wheel and pivoted to the hub thereof, an extension on one of the members above the pivot, a bolt in said extension, a spring on said bolt for pressing the same outwardly, and a segment-piece secured to the hub and the frame of the cycle through the medium of a pivoted link, said segment-piece having a segmental slot therein, having enlarged ends, said bolt sliding in said slot and having its head adapted to fit in the enlarged ends whereby it will lock the support in either vertical or horizontal position.

In witness whereof we have hereunto set our hands in presence of two witnesses.

WILLIAM CLAYTON LLOYD.
CHARLES RALPH TOWNSEND.

Witnesses:
H. BARKER LAKE,
HAROLD J. FORRESTER.